(12) United States Patent
Lee et al.

(10) Patent No.: US 7,145,864 B2
(45) Date of Patent: Dec. 5, 2006

(54) REDUNDANT LINK MANAGEMENT SWITCH FOR USE IN A STACK OF SWITCHES AND METHOD THEREOF

(75) Inventors: Chih-Chiang Lee, Chang-Hua (TW); Fuh-Jang Lin, Hsinchu (TW)

(73) Assignee: Action Technology Corporation, Hsinchu (TW)

( * ) Notice: Subject to any disclaimer, the term of this patent is extended or adjusted under 35 U.S.C. 154(b) by 1091 days.

(21) Appl. No.: 10/041,505

(22) Filed: Jan. 10, 2002

(65) Prior Publication Data
US 2003/0128662 A1 Jul. 10, 2003

(51) Int. Cl.
*G01R 31/08* (2006.01)
(52) U.S. Cl. ........................... 370/216; 370/223
(58) Field of Classification Search .................. None
See application file for complete search history.

(56) References Cited

U.S. PATENT DOCUMENTS 5,805,817 A * 9/1998 Yu et al. ..................... 709/224
6,928,049 B1 * 8/2005 Shabtay et al. ............. 370/223
2003/0193891 A1 * 10/2003 Chen et al. ................. 370/217

* cited by examiner

*Primary Examiner*—Doris H. To
*Assistant Examiner*—Robert W. Wilson
(74) *Attorney, Agent, or Firm*—Birch, Stewart, Kolasch & Birch, LLP.

(57) ABSTRACT

A redundant link management switch for use in a stack of switches forming a closed-loop link topology, including a stacking module, a processor and a management module. The stacking module has an uplink port for connecting a next-higher switch in the stack and a downlink port for connecting a next-lower switch in the stack. The processor instructs the stacking module to disable a downlink control bus within the downlink port when receiving a disconnect command, and instructs the stacking module to enable the downlink control bus when receiving a reconnect command. The management module asserts the disconnect command if a link status, received from the processor, indicates that the redundant link management switch and the stack of switches are stacked into the closed-loop link topology. Additionally, the management module asserts the reconnect command to recover a redundant link if the management module detects that the closed-loop link topology is changed.

10 Claims, 7 Drawing Sheets

REDUNDANT LINK MANAGEMENT SWITCH FOR USE IN A STACK OF SWITCHES AND METHOD THEREOF

FIELD OF THE INVENTION

The present invention relates generally to computer networks and, in particular, to a redundant link management switch for use in a stack of switches.

BACKGROUND OF THE INVENTION

A typical computer network consists of nodes (computers), a connecting medium (wired or wireless), and specialized network equipment like routers and hubs. In the case of the Internet, all these pieces working together allow one computer to send information to another computer that may be on the other side of the world. Switches are a fundamental part of most networks. They make it possible for several users to send information over a network at the same time without slowing each other down. Just like routers allow different networks to communicate with each other, switches allow different nodes of a network to communicate directly with each other in a smooth and efficient manner.

The use of stackable switches allows network administrators to build systems having multiple physical ports to various computing resources or workstations on the network. FIG. 1 illustrates a stack of switches that can be constructed by stacking switches 110a~d. To enable the stackable capability of each switch, the switches 110a~d are respectively equipped with stacking modules 112a~d as depicted. The stacking module 112a of the switch 110a is connected to stacking module 112b of the switch 110b with link 120a, and the stacking module 112b of the switch 10b is connected to stacking module 112c of the switch 110c with link 120b. Likewise, link 120c connects the switches 110c and 110d. The benefits of stacking are throughput boost, downlink resources share, and easy management. The switch stack 100 delivers high-performance switch-to-switch connections, while conserving ports. Network administrators may manage the entire switch stack 100 as one virtual switch.

However, the entire switch stack 100 is disrupted in the case of a single link or single switch failure anywhere in the stack 100. Since the switch stack 100 is arranged as a simple chain, as shown in FIG. 1, without a redundant link, the rest of the switches cannot be stacked together until the network administrator manually solves the problems.

Therefore, what is needed is a way to automatically recover a switch stack in the case of switch or link failure, unencumbered by the limitations associated with the prior art.

SUMMARY OF THE INVENTION

It is an object of the present invention to provide a redundant link for a stack of switches within a network.

It is another object of the present invention to provide a redundant link management switch for use in a stack of switches forming a closed-loop link topology.

The foregoing objects are achieved in a redundant link management switch including a stacking module, a processor and a management module. The stacking module has an uplink port and a downlink port. The uplink port connects a next-higher switch in the stack, and the downlink port connects a next-lower switch in the stack, in which a link connecting the downlink port and the next-lower switch is a redundant link for the switch stack. The processor instructs the stacking module to disable a downlink control bus within the downlink port when receiving a disconnect command, and instructs the stacking module to enable the downlink control bus when receiving a reconnect command. The processor also provides a link status. The management module performs a redundant link management function. It asserts the disconnect command to the processor if the link status indicates that the redundant link management switch and the stack of switches are stacked into the closed-loop link topology. Moreover, the management module asserts the reconnect command to the processor to recover the redundant link if the management module detects that the closed-loop link topology is changed.

In another aspect of the invention, a method of managing a redundant link for use in a stack of switches is disclosed. Every two switches in the switch stack are first connected to form a closed-loop link topology. A link status is detected and the redundant link in the stack is deactivated if the link status indicates that the switch stack forms the closed-loop link topology. Each switch is polled through one or more links within the switch stack. If one of the switches in the switch stack fails to respond to the polling, the redundant link in the switch stack is activated. Thereafter, the switches are re-initialized to form a new switch stack in which the redundant link is activated.

Further scope of the applicability of the present invention will become apparent from the detailed description given hereinafter. However, it should be understood that the detailed description and specific examples, while indicating preferred embodiments of the invention, are given by way if illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawing, which are given by way of illustration only, and thus are limitative of the present invention, and in which:

FIG. 4 illustrates a flowchart of a method of managing a redundant link for use in a stack of switches.

DETAILED DESCRIPTION OF THE PREFERRED EMBODIMENT

Figure 1:
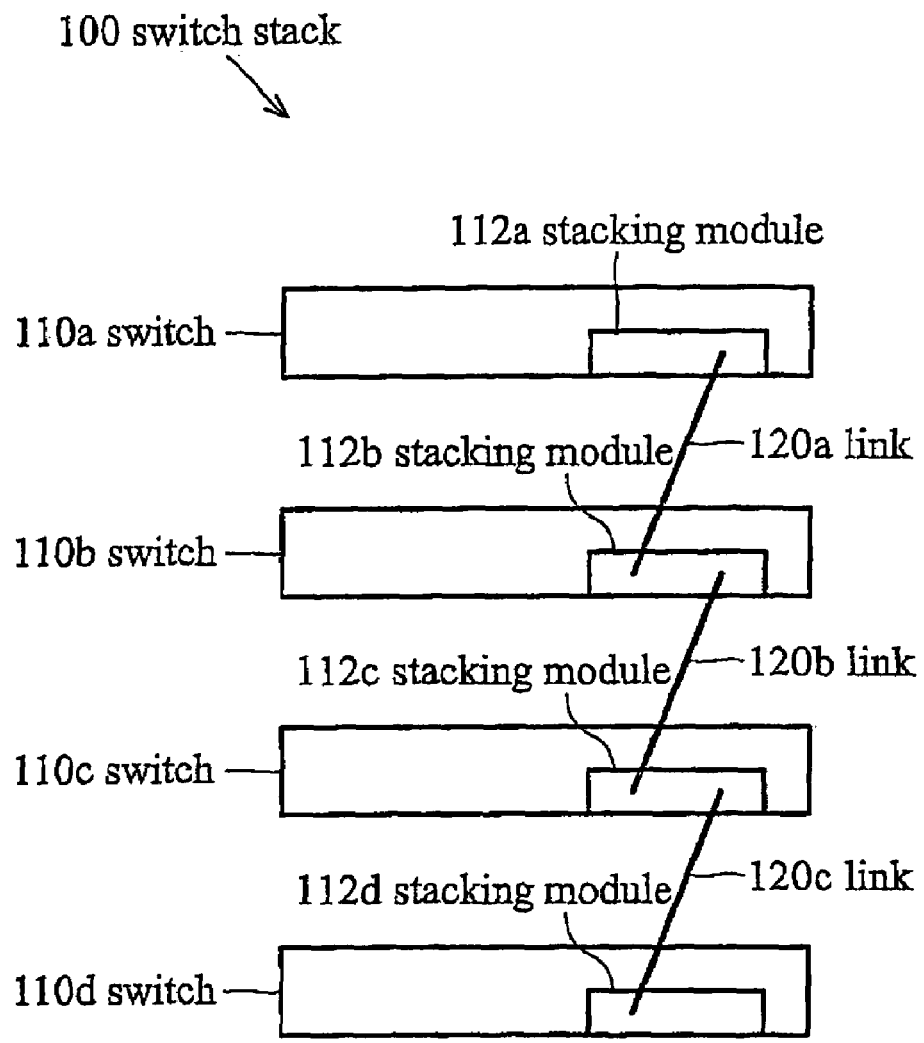
FIG. 1 illustrates stacking of switches.
Figure 2A:
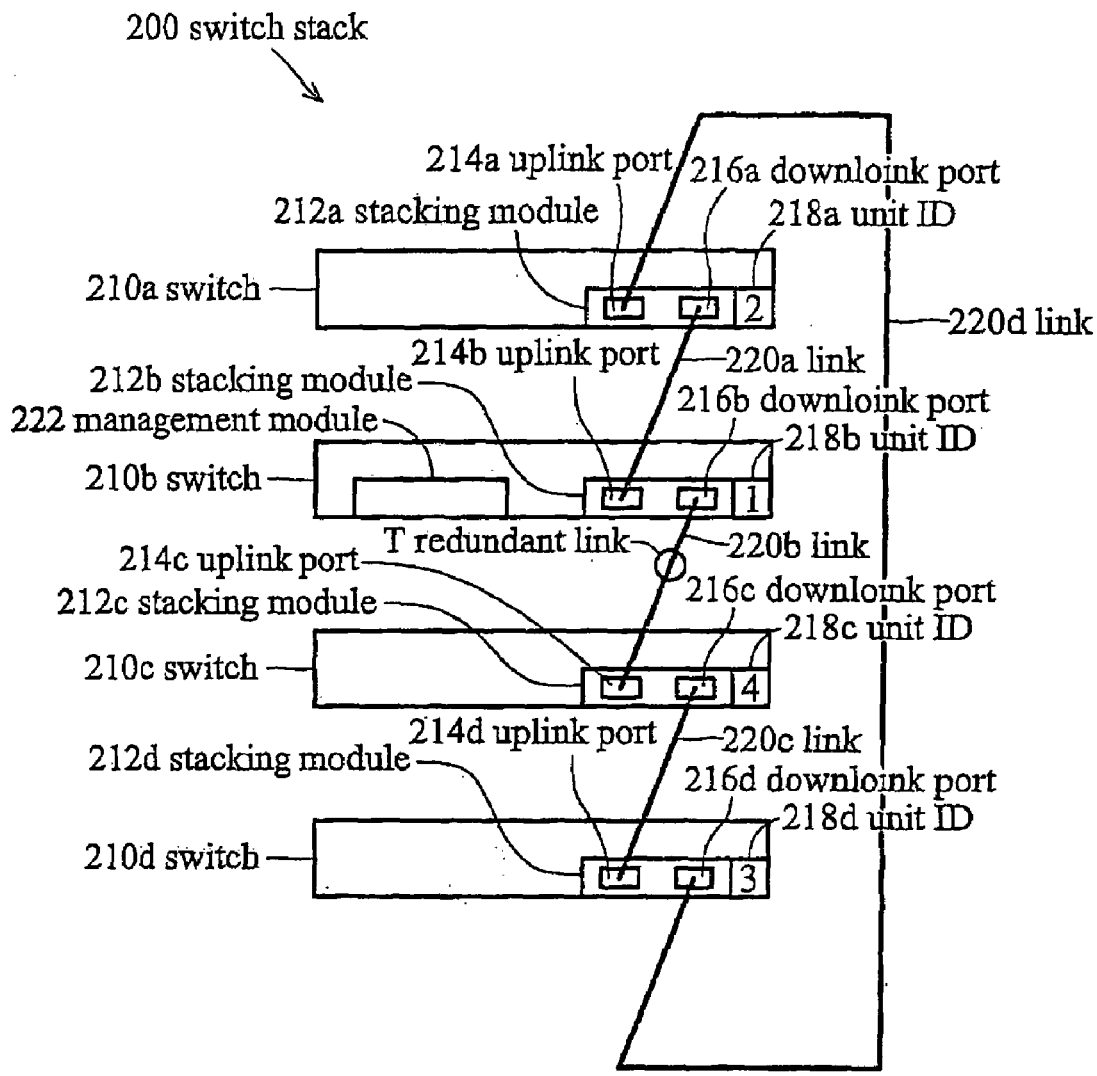
FIG. 2A is a stack of switches forming a closed-loop link topology in accordance with the invention.

As illustrated in FIG. 2A, switches 210a~d are stacked together to form a switch stack 200. Each switch, 210a, 210b, 210c, 210d, is respectively equipped with a stacking module, 212*a*, 212*b*, 212*c*, and 212*d*. Each stacking module includes an uplink port and a downlink port. On the switch 210*b* of the stack 200 for example, uplink port 214*b* connects a next-higher switch, i.e. the switch 210*a*, and downlink port 216*b* connects a next-lower switch, i.e. the switch 210*c*. According to the invention, every two switches are connected to form a closed-loop link topology. That is, a link 220*a* is connected between a downlink port 216*a* of the stacking module 212*a* and an uplink port 214*b* of the stacking module 212*b*. A link 220*b* is connected between a downlink port 216*b* of the stacking module 212*b* and an uplink port 214*c* of the stacking module 212*c*. As well, a link 220*c* is connected between a downlink port 216*c* of the stacking module 212*c* and an uplink port 214*d* of the stacking module 212*d*. Specifically, there is a link 220*d* connected between a downlink port 216*d* of the stacking module 212*d* and an uplink port 214*a* of the stacking module 212*a*. The switches 210*a~d* are connected together in the above-described manner to form the closed-loop link topology instead of a simple chain.

At least one switch in the switch stack 200 can be equipped with an agent module, e.g. management module 222. In one embodiment, the management module 222 is installed in the switch 210*b*. The management module 222 allows administrators to configure or monitor the switch stack using the network management applications. In addition, the management module 222 performs a redundant link management function. When the management module 222 is installed, the switch 210*b* becomes a redundant link management switch in the switch stack 200. It should be understood to those skilled in the art that additional switches equipped with the management modules to provide fault tolerance is contemplated by the principles of the invention.

If the switches 210*a~d* are connected with the closed-loop link topology in accordance the with the invention, every unit IDs 218*a~d* in the respective switches continues changing upon power-on. During power-on initialization, the management module 222 informs the stacking module 212*b* to block the signals of downlink port 216*b* so that the link 220*b* (marked 'T' in FIG. 2A) is terminated or isolated. As a result, the switches 210*a~d* in the stack 200 transmit/receive signals over a path including the links 220*a*, 220*c*, 220*d* like the simple chain, in which the link 220*b* is a redundant link for the stack 200. After initialization, digit '1' is assigned to the unit ID 218*b* of the switch 210*b*, digit '2' is assigned to the unit ID 218*a* of the switch 210*a*, and digits '3' and '4' are respectively assigned to the unit IDs 218*d*, 218*c* of the switch 210*d*, 210*c*.

Figure 2B:
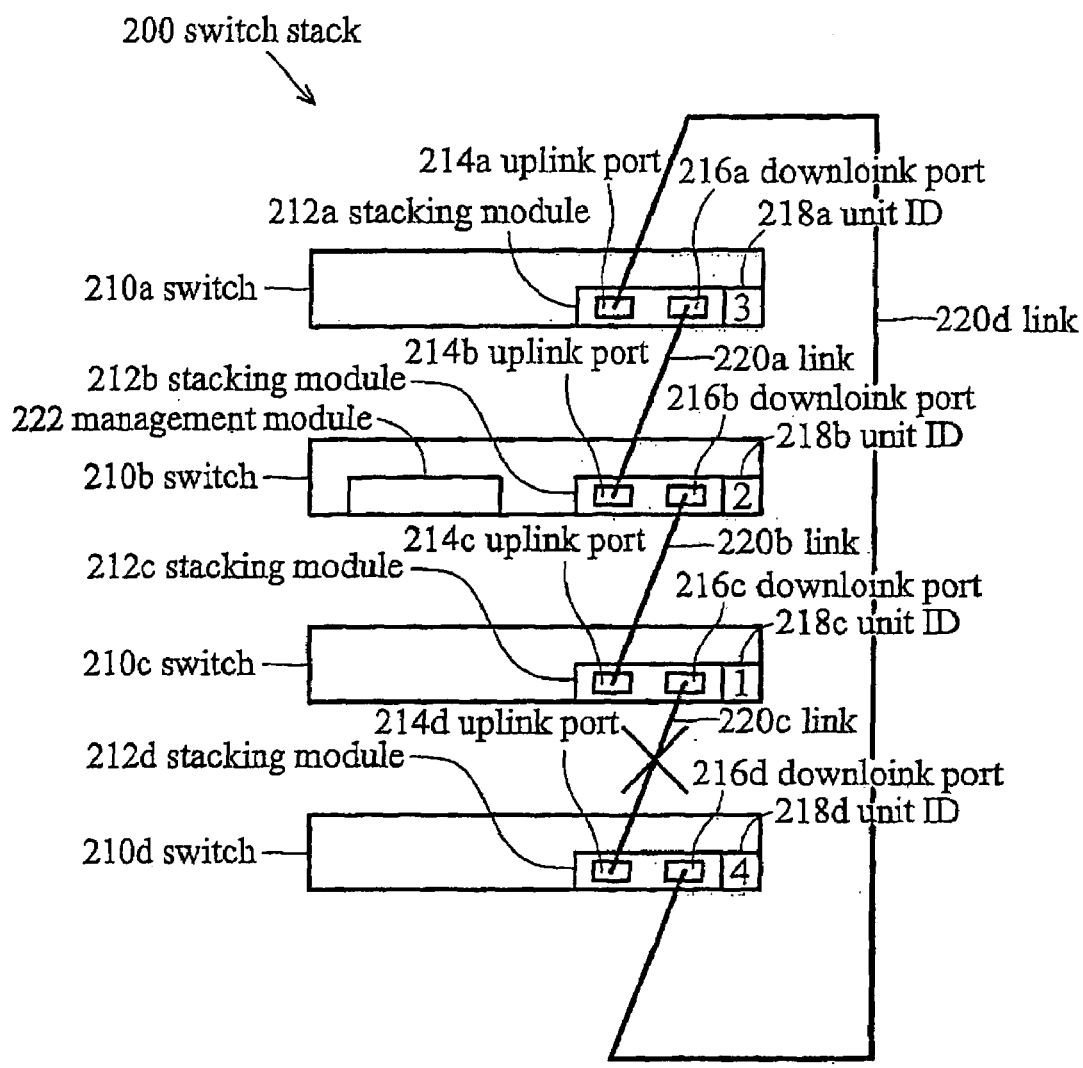
FIG. 2B illustrates one stacking recovery example in accordance with the invention.
Figure 2C:
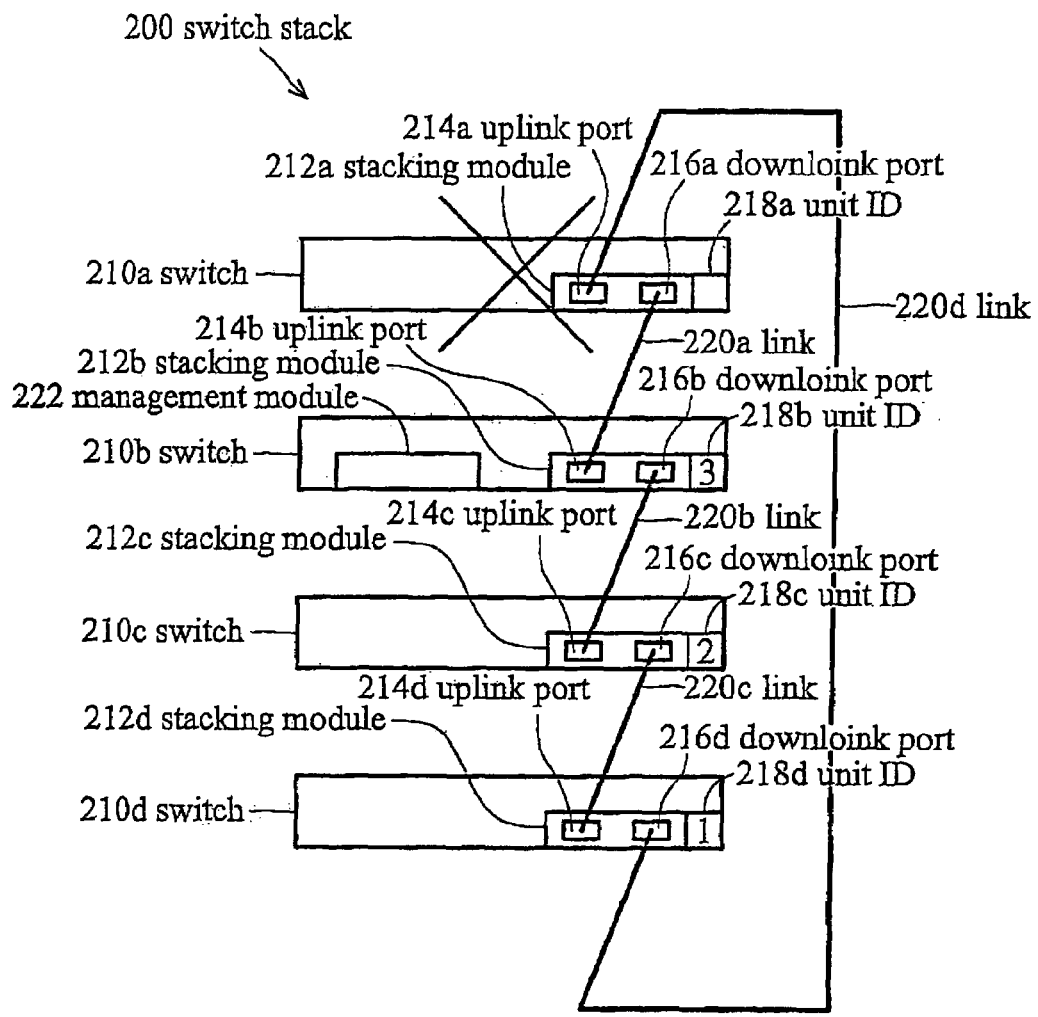
FIG. 2C illustrates another stacking recovery example in accordance with the invention.
Figure 2D:
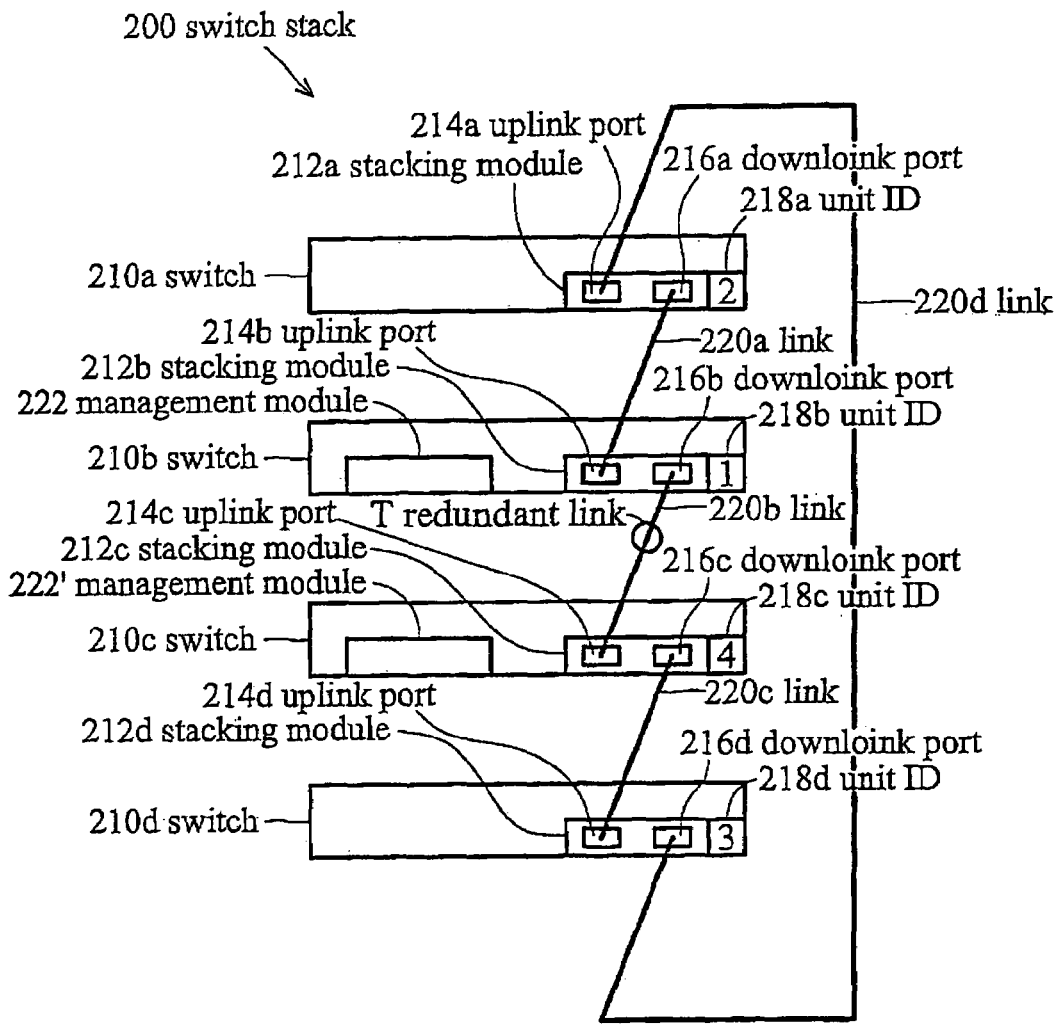
FIG. 2D illustrates another stacking recovery example in accordance with the invention.
Figure 2E:
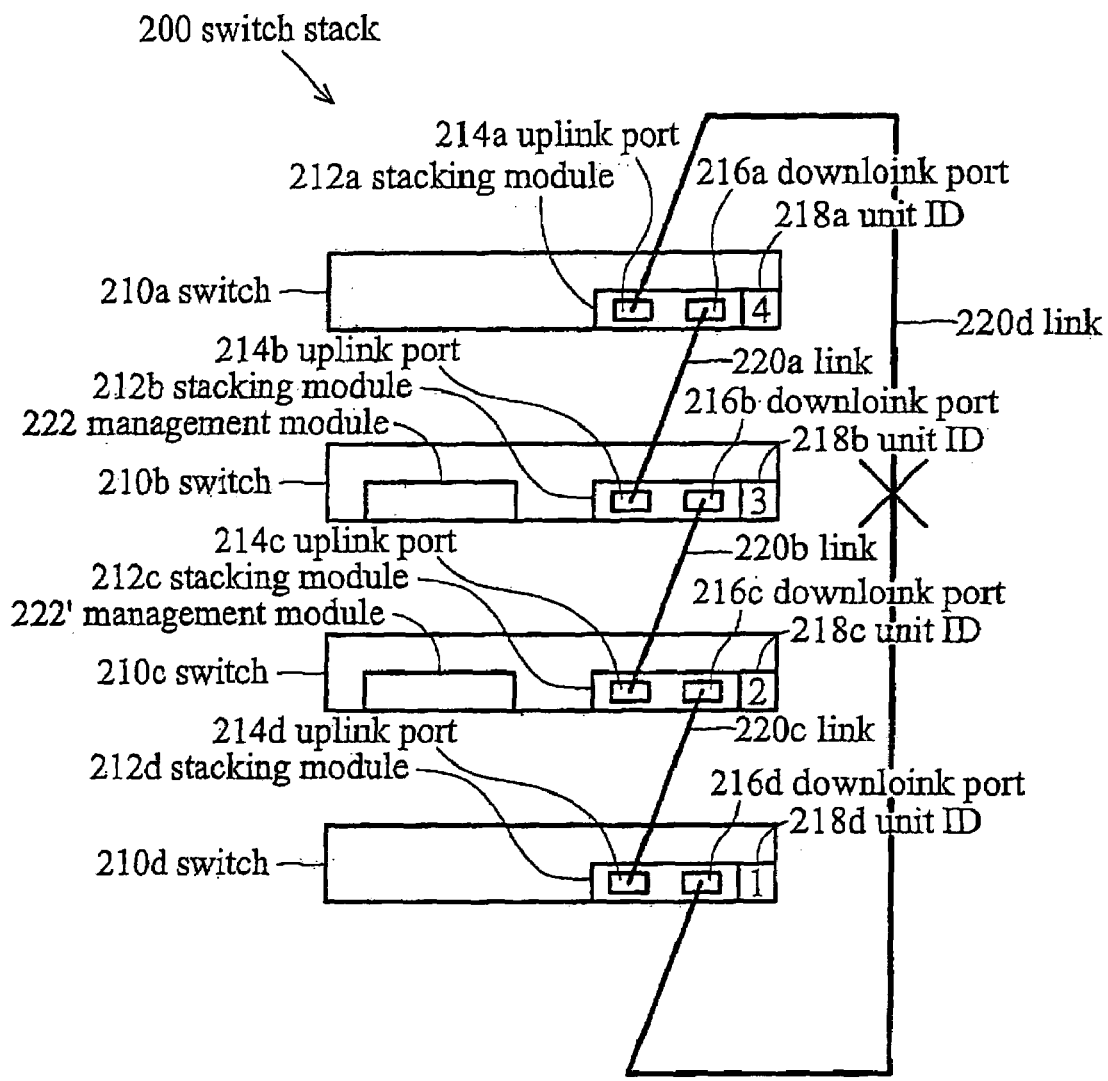
FIG. 2E illustrates another stacking recovery example in accordance with the invention.

In case of a link or switch failure in the switch stack 200, the redundant link 220*b* of the invention provides the ability to automatically recover from such failures. Referring to FIG. 2B, if the link 220*c* fails for some reason, the management module 222 informs the stacking module 212*b* to enable the downlink port 216*b* so as to reconnect the link 220*b* upon detecting the failure. Then, the switches 210*a~d* are re-initialized and digits '3', '2', '1', '4' are respectively reassigned to the unit IDs 218*a~d* of the switches 210*a~d* as depicted. With the redundant link 220*b*, the switches 210*a~d* can be re-stacked together to form a new switch stack 200' without manual operation. In another example, where the switch 210*a* is down as shown in FIG. 2C, the redundant link 220*b* is reactivated to recover the stack from the failure. As depicted, the unit IDs 218*b~d* of the switches 210*b~d* are '3', '2', '1' respectively and a new switch stack 200" is constructed from the switches 210*b~d* in the same manner as described above.

Figure 3A:
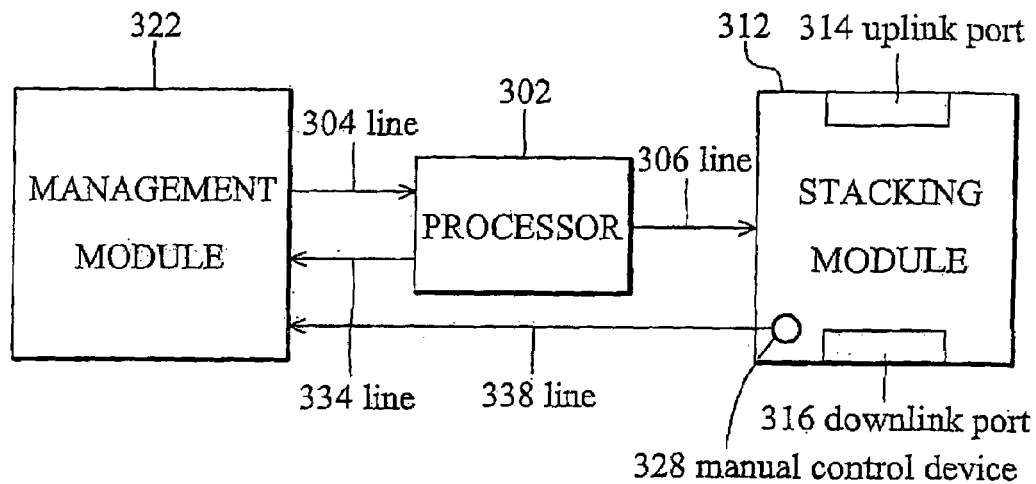
FIG. 3A is a simplified block diagram of a redundant link management switch of the invention.

A key goal of the invention is to provide a redundant link management switch which realizes the closed-loop link topology. Referring to FIG. 3A, a redundant link management switch includes a stacking module 312, a processor 302 and a management module 322. The stacking module 312 has an uplink port and a downlink port. The uplink port is used to connect a next-higher switch in a switch stack, and the downlink port is used to connect a next-lower switch in the switch stack. Of course, the terms up, down, higher, lower, etc., are merely for explanation and the physical locations of switches in the stack can vary, especially as switches are added, removed, or replaced. According to the invention, the redundant link is defined as a link connected between the downlink port of the redundant link management switch and the next-lower switch.

Figure 3B:
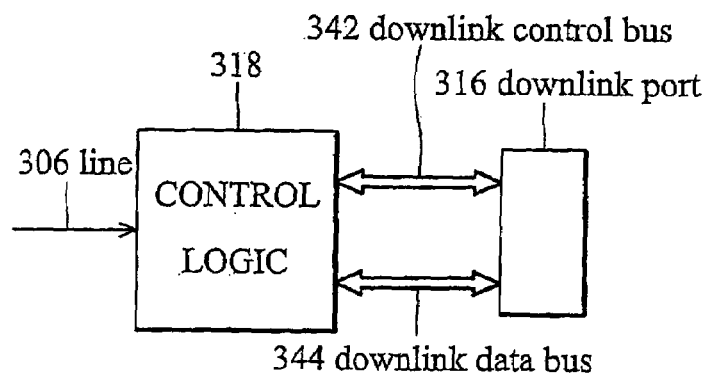
FIG. 3B is a block diagram of a control logic incorporated in a stacking module.

The processor 302 instructs the stacking module 312 via a line 306 to disable a downlink control bus within the downlink port 316 when receiving a disconnect command, and instructs the stacking module 312 via the line 306 to enable the downlink control bus when receiving a reconnect command. The processor 302 also provides a link status, via a line 334, to the management module 322. In one embodiment, the stacking module 312 has a control logic 318 coupled to the downlink port 316 as shown in FIG. 3B. Typically, the signals passed through the downlink port 316 include a downlink control bus 342 and a downlink data bus 344. When the processor 302 receives the disconnect command, it instructs the control logic 318 via the line 306 to isolate the redundant link by disabling the downlink control bus 342 within the downlink port 316. When the processor 302 receives the connect command, it instructs the control logic 318 via the line 306 to recover the redundant link by enabling the downlink control bus 342.

The management module 322 performs a redundant link management function. In one embodiment, the stacking module 312 has a manual control device 328, such as a button, to enable the redundant link management function when the management module 322, via a line 338, detects that the manual control device 328 is activated. The stacking module 312 preferably includes an LED (not shown) to indicate whether the redundant link management function is enabled or not. According to the invention, the management module 322 asserts the disconnect command via a line 304 to the processor 302 if the link status indicates that the redundant link management switch and the stack of switches are stacked into the closed-loop link topology. In one embodiment, the stacking module 312 generates a unit ID of the switch to the processor 302 via a line 336. The unit ID also signals the link status. In other words, the link status indicates that the redundant link management switch and the stack of switches are stacked in a closed-loop link topology when the unit ID keeps changing. The processor 302 detects the unit ID from the stacking module 312 and reports the link status to the management module 322. In addition, the management module asserts the reconnect command via the line 304 to the processor 302 to recover the redundant link if the management module 322 detects that the closed-loop link topology is changed whenever a failure occurs in one of the switches or links within the switch stack.

A method for managing the redundant link is illustrated in more detail by a flowchart depicted in FIG. 4. Every two switches in the switch stack are first connected to form the closed-loop link topology (step S410). During power-on initialization, the management module 322 detects the link status (step S420). If the link status indicates that the switch stack forms the closed-loop link topology (step S430), the redundant link in the stack is deactivated (step S440).

Further, when the manual control device 328 for enabling the redundant link function is activated and the unit ID keeps changing, the control logic 318 is instructed to disable the downlink control bus 342 in the redundant link. Otherwise, a regular process for a stack connected as the simple chain is performed (step S490). After initialization, each of the switches in the stack is assigned a fixed unit !D. Each switch is polled through one or more links within the switch stack (step S450). If one of the switches in the switch stack fails to respond to the polling (step S460), the redundant link in the switch stack is activated (step S470). The control logic 318 is instructed to enable the downlink control bus 342 in the redundant link, thereby recovering the redundant link in the switch stack. Thereafter, the switches are re-initialized (step S480), and thus the switches can be re-stacked together to form a new switch stack without manual operation, in which the redundant link is activated.

Accordingly, the present invention discloses a redundant link management switch for use in a stack of switches forming a closed-loop link topology. The invention therefore provides a way to automatically recover a switch stack in the case of switch or link failure.

While the invention has been described by way of example and in terms of the preferred embodiment, it is to be understood that the invention is not limited to the disclosed embodiment. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A redundant link management switch for use in a stack of switches forming a closed-loop link topology, comprising:
   a stacking module, having an uplink port and a downlink port, the uplink port for connecting a next-higher switch in the stack, the downlink port for connecting a next-lower switch in the stack;
   a processor, for instructing the stacking module to disable a downlink control bus within the downlink port when receiving a disconnect command, for instructing the stacking module to enable the downlink control bus when receiving a reconnect command, and the processor providing a link status; and
   a management module, for performing a redundant link management function, the management module asserting the disconnect command to the processor if the link status indicates that the redundant link management switch and the stack of switches are stacked into the closed-loop link topology, and asserting the reconnect command to the processor to recover a redundant link if the management module detects that the closed-loop link topology is changed;
   wherein the redundant link is connected between the downlink port of the redundant link management switch and the next-lower switch.

2. The redundant link management switch as recited in claim 1 wherein the stacking module comprises a control logic coupled to the downlink port, to isolate the redundant link by disabling the downlink control bus within the downlink port, and to recover the redundant link by enabling the downlink control bus within the downlink port.

3. The redundant link management switch as recited in claim 2 wherein the stacking module further comprises a manual control device to enable the redundant link management function when the management module detects that the manual control device on the stacking module is activated.

4. The redundant link management switch as recited in claim 1 wherein the link status is signaled by a unit ID of the redundant link management switch, and wherein the unit ID is generated from the stacking module.

5. The redundant link management switch as recited in claim 4 wherein the link status indicates that the redundant link management switch and the stack of switches are stacked into the closed-loop link topology when the unit ID keeps changing.

6. The redundant link management switch as recited in claim 5 wherein the processor detects the unit ID generated from the stacking module and reports the link status to the management module.

7. The redundant link management switch as recited in claim 1 wherein the closed-loop link topology is changed whenever a failure occurs in one of the switches within the switch stack.

8. The redundant link management switch as recited in claim 1 wherein the closed-loop link topology is changed whenever a link within the switch stack fails.

9. A method of managing a redundant link for use in a stack of switches comprising the steps of:
   connecting every two switches in the switch stack to form a closed-loop link topology;
   detecting a link status;
   deactivating the redundant link in the stack if the link status indicates that the switch stack forms the closed-loop link topology;
   polling each switch through one or more links within the switch stack;
   activating the redundant link in the switch stack if one of the switches in the switch stack fails to respond to the polling; and
   re-initializing the switches to form a new switch stack in which the redundant link is activated; and
   assigning a unit ID to each switch stack,
   wherein the deactivating step disables a downlink control bus in the redundant link of a manual control device for enabling a redundant link function is activated and the link status, signaled by the unit ID which keeps changing, indicates the switch stack forming the closed-loop link topology.

10. The method of claim 9 wherein the activating step enables the downlink control bus in the redundant link, thereby recovering the redundant link in the switch stack.

* * * * *